United States Patent [19]
Ito et al.

[11] Patent Number: 5,677,513
[45] Date of Patent: Oct. 14, 1997

[54] TYING DEVICE FOR WIRING HARNESS

[75] Inventors: Takeharu Ito; Takahiro Kato; Hiroshi Kuroda; Mikio Satou; Chigusa Ichio; Tutomu Sakata, all of Yokkaichi, Japan

[73] Assignee: Sumitomo Wiring Systems, Ltd., Yokkaichi, Japan

[21] Appl. No.: 298,157

[22] Filed: Aug. 30, 1994

[30] Foreign Application Priority Data

Oct. 21, 1993 [JP] Japan ................. 5-263860

[51] Int. Cl.$^6$ ........................ F16L 3/00
[52] U.S. Cl. .............. 174/72 A; 24/339; 24/442; 248/68.1; 248/74.2; 248/74.3
[58] Field of Search ............... 174/72 A, 28, 174/99 R, 99 B, 40 R; 248/49, 68.1, 68.3, 74.3; D8/356, 357, 358, 359; 24/339, 336, 335, 345, 10 PB, 442; D13/154

[56] References Cited

U.S. PATENT DOCUMENTS

| | | |
|---|---|---|
| 3,473,768 | 10/1969 | Piasecki ............... 248/68.1 |
| 4,360,177 | 11/1982 | Dulhunty ............... 174/40 R |
| 4,453,353 | 6/1984 | Killop et al. ............ 174/136 X |
| 5,316,247 | 5/1994 | Wodka ................. 248/68.1 X |

FOREIGN PATENT DOCUMENTS 1122574  8/1989  Japan .

Primary Examiner—Hyung S. Sough
Attorney, Agent, or Firm—Greenblum & Bernstein, P.L.C.

[57] ABSTRACT

A tying device for tying a wiring harness having a first annular holder for holding general wires, which has a first slit for inserting therethrough the general wires into the first annular holder; and a second annular holder for holding specific wires, which has a second slit for inserting therethrough the specific wires into the second annular holder and has a diameter smaller than that of the first annular holder so as to extend into the first annular holder from an inner peripheral surface of the first annular holder through a rib; wherein the second annular holder is positioned at a central portion of the first annular holder such that a space for accommodating the general wires is defined between the inner peripheral surface of the first annular holder and an outer peripheral surface of the second annular holder.

16 Claims, 12 Drawing Sheets

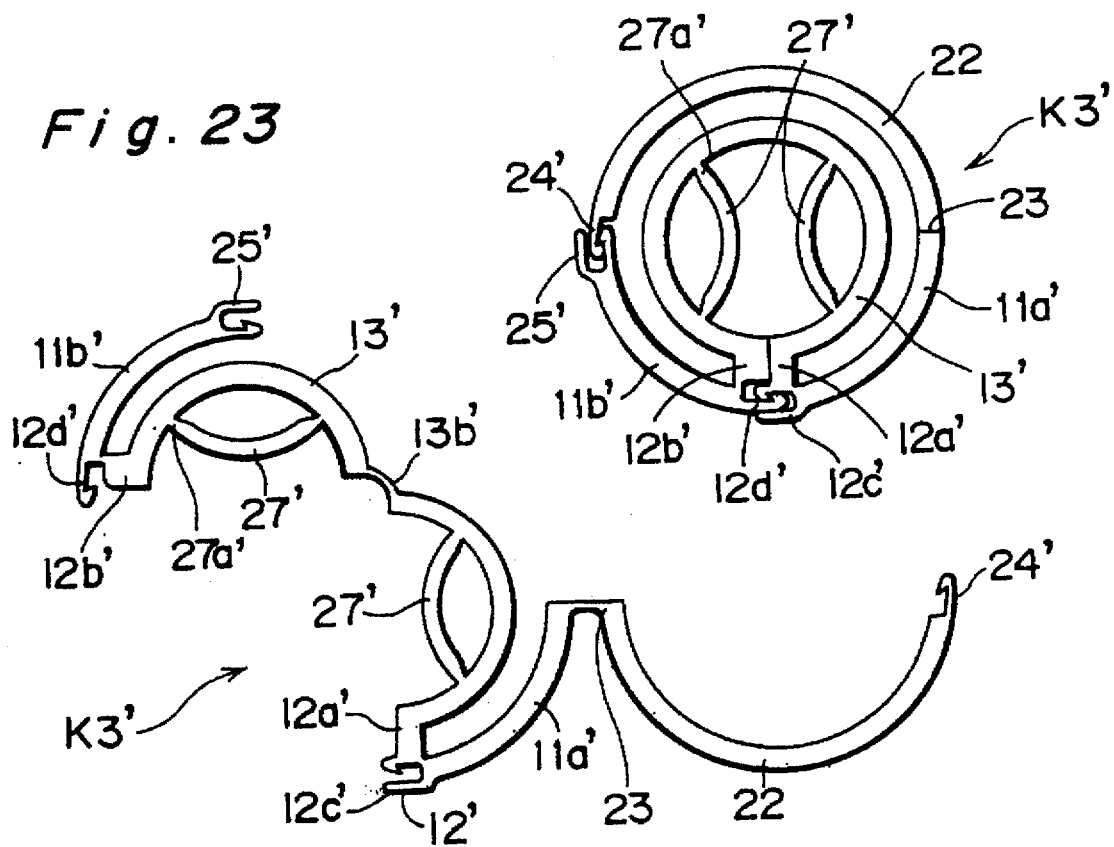

TYING DEVICE FOR WIRING HARNESS

BACKGROUND OF THE INVENTION

The present invention generally relates to a tying device for bundling a plurality of wires including specific wires in a wiring harness and more particularly, to a tying device which is capable of positioning and holding the specific wires at a central portion of general wires.

Conventionally, wiring jigs 2 are mounted on necessary locations of an upper face of a wiring harness assembly drawing board 1 so as to stand on the wiring harness assembly drawing board 1 as shown in FIG. 1 and then, necessary wires W are inserted into wire receivers 2a of the wiring jigs 2. In this state, while the wire group is being lifted upwardly from the wire receivers 2a, a binding member such as a tape 3 is wound around an outer periphery of the wire group so as to bundle the wire group.

In a wiring harness in which a number of the wires are bundled as described above, a wire to which noises should be positively prevented from being inputted and a wire which should not be short-circuited to a vehicle body panel absolutely, for example, a power source line connected directly to a battery from which voltage is supplied to a lamp system such as a head lamp or a motor-driven door locking system at all times upon insertion of a key into a motor vehicle and a twist wire for a loud-speaker should not be positioned at a sectionally outer peripheral portion of the bundled wire group but are preferably positioned at a sectionally central portion of the bundled wire group. Namely, since electric current of large capacity flows through the above mentioned power source line, it is preferable that the power source line is positioned at the center of the wire group, where breaking of the power source line through interference from the vehicle body panel is least likely to take place. Meanwhile, as the twist wire for the loud-speaker is positioned at a location closer to the center of the wire group, it is possible to prevent generation of noises in the twist wire more positively.

However, in the known wiring harness bundling method shown in FIG. 1, a number of the wires W are inserted into the wire receivers 2a of the wiring jigs 2 from an upper opening of each of the wire receivers 2a at random and no means is provided by which specific wires to be positioned at the center of the wire group, for example, the power source line and the twist wire referred to above are positioned and held at the center of the wire group. This can be achieved during wiring operation if an operator bundles the wires while positioning the specific wires at the center of the wires. However, in case the operator does not recognize which ones of the wires are the specific wires, it is impossible to position the specific wires at the center of the wires.

On the other hand, even if the operator tries to position the specific wires at the center of the wires by recognizing which ones of the wires are the specific wires, the specific wires are usually plural in number and it is difficult to bundle the wires while a plurality of the specific wires are being positioned at the center of the wires.

Therefore, in a known wiring harness, it has been impossible to positively obviate such a problem that the specific wires W-S which should be desirably positioned at the sectional center of the wiring harness are disposed at an outer peripheral portion of the wiring harness as shown in FIG. 2. In order to solve this problem, Japanese Utility Model Laid-Open Publication No. 1-122574 (1989) proposes a tying device 4 exclusively used for positioning the specific wires as shown in FIG. 3. The tying device 4 includes a substantially annular holding member 4a and three projections 4b extending radially outwardly from the holding member 4a. In a state where the specific wires W-S are accommodated in the holding member 4a, the specific wires W-S and the tying device 4 are secured to each other by a tape. Then, in a state where the general wires W are disposed at an outer periphery of the holding member 4a for the specific wires W-S, the tape 3 is wound around these wires and thus, a wiring harness is obtained.

If the tying device 4 is employed, the tape 3 is wound around the wires along outer peripheral surfaces of a plurality of the projections 4b and thus, outside diameter of the wire bundle should correspond to that of the tying device 4. Therefore, the tying device 4 has such a drawback that a number of different kinds of wiring harnesses should be prepared for different outside diameters of the wiring harness. Furthermore, since an opening of the holding member 4a has a large mouth and the mouth opens radially outwardly, such a case may happen that the specific wires W-S are likely to be drawn out of the holding member 4a and thus, cannot be positioned and held at the center of the wiring harness. Furthermore, since the tying device 4 does not have any means for holding the general wires W disposed at the outer periphery of the holding member 4a, it is troublesome to wind the tape around the wire group so as to bundle the whole wire group.

SUMMARY OF THE INVENTION

Accordingly, an essential object of the present invention is to provide, with a view to eliminating the drawbacks of conventional tying devices, a tying device which is capable of bundling a group of wires including specific wires and general wires in a wiring harness in a state where the specific wires are positioned at a sectional center of the wiring harness so as to be enclosed by the general wires.

In order to accomplish this object of the present invention, a tying device for tying a wiring harness, according to the present invention comprises: a first annular holder for holding general wires, which has a first slit for inserting therethrough the general wires into the first annular holder; and a second annular holder for holding specific wires, which has a second slit for inserting therethrough the specific wires into the second annular holder and has a diameter smaller than that of the first annular holder so as to extend into the first annular holder from an inner peripheral surface of the first annular holder through a rib; wherein the second annular holder is positioned at a central portion of the first annular holder such that a space for accommodating the general wires is defined between the inner peripheral surface of the first annular holder and an outer peripheral surface of the second annular holder.

The specific wires are inserted into the second annular holder through the second slit and then, the general wires are inserted into the space through the first slit. Thereafter, a tape is wound around the first annular holder so as to close the first slit.

The tying device is formed by integral molding of flexible material including rubber such as elastomer or plastic. The tape is wound around the first annular holder in accordance with amount of the general wires inserted into the space. For example, when amount of the general wires is large, the tape is wound around the first annular holder in a state where the first slit of the first annular holder is expanded. On the contrary, when amount of the general wires is small, the tape is wound around the first annular holder in a state where opposite sides of the first slit of the first annular holder are overlapped. Thus, the space for accommodating the general wires is varied in accordance with amount of the inserted general wires such that the general wires can be closely held without backlash among the general wires.

It is preferable that a pair of protrusions are, respectively, curved radially inwardly or outwardly from opposite sides of the second slit of the second annular holder so as to be brought into contact with each other such that the second slit is closed by the protrusions. As a result, the specific wire inserted into the second annular holder can be held positively.

The first and second slits are aligned with each other so as to confront each other. When the tying device has been placed on a wiring drawing board, the first and second slits are oriented upwardly such that the general wires and the specific wires are inserted into the tying device through the first and second slits from above.

Meanwhile, the first slit is formed by a large opening and a lid is continuously provided, through a thin hinge, on the first annular holder at one end of the opening. Furthermore, an engageable portion is provided at a distal end of the lid and a mating engageable portion engageable with the engageable portion is provided on the first annular holder at the other end of the opening such that the lid is locked to the first annular holder through engagement of the engageable portion with the mating engageable portion. When the general wires and the specific wires have been inserted into the tying device, the lid is closed and then, the engageable portion and the mating engageable portion are brought into engagement with each other. As a result, it becomes unnecessary to wind the tape around the first annular holder.

In order to mount the tying device on a wiring drawing board, a mounting portion is provided at a lower end of the first annular holder and is inserted into a mounting opening of a jig installed on the wiring drawing board so as to be engaged with the mounting opening.

On the other hand, in case the mounting portion for mounting the tying device on the wiring drawing board is not provided on the tying device, a jig having a pair of retainers for retaining lower end portions of the first annular holder is installed on the wiring drawing board.

The rib is axially divided into a pair of rib portions and the second slit is defined between one end of one of the rib portions and one end of the other of the rib portions such that opposed inner faces of the rib portions are brought into contact with each other. An engageable portion and a mating engageable portion engageable with each other are, respectively, provided on the inner faces of the rib portions. After the specific wires have been inserted into the second annular holder in a state where the second slit is expanded by spacing the rib portions away from each other, the engageable portion and the mating engageable portion are brought into contact with each other. Furthermore, the first annular holder is divided into a pair of side portions such that the side portions extend continuously from the other end of one of the rib portions and the other end of the other of the rib portions, respectively.

When the first annular holder is divided into a pair of the side portions, a pair of upwardly oriented U-shaped hollows for accommodating the general wires are defined at opposite sides of the first annular holder and a downwardly oriented circular cavity for accommodating the specific wires is continuously defined between the hollows. In case these three curved portions are formed integrally with each other, the tying device is not required to be mounted on the wiring drawing board. Namely, after the specific wires have been inserted into the second annular holder, the hollows of the first annular holder are oriented downwardly and placed from above on the general wires wired by the jigs on the wiring drawing board, so that the general wires can be inserted into the first annular holder.

A lid is provided at a distal end of one of the side portions through a further thin hinge and a further engageable portion is provided at a distal end of the lid, while a further mating engageable portion engageable with the further engageable portion is provided at a distal end of the other of the side portions. By this arrangement, after the general wires have been inserted into the first annular holder, the lid is closed at a lower side of the tying device such that the general wires are held by the tying device.

Meanwhile, in case the second annular holder is formed as described above, a thin hinge is preferably formed on a peripheral wall of the second annular holder so as to confront the second slit such that the second annular holder can be opened easily.

Furthermore, when a pair of thin partition walls are, respectively, provided in the second annular holder at opposite sides of the second slit and the specific wires are inserted into a further space defined between the partition walls such that the partition walls are brought into contact with the specific wires, the specific wires can be preferably closely held without backlash among the specific wires.

In case the wiring harness is tied by the tying device of the above described arrangements when the first annular holder is not divided into a pair of the side portions, the tying device is initially mounted on the wiring drawing board by using the jigs such that the first and second slits are oriented outwardly. Subsequently, the specific wires are inserted into the second annular holder by expanding the second slit and then, the general wires are inserted into the space by expanding the first slit.

After the specific wires and the general wires have been inserted into the tying device as described above, the tape is wound around the first annular holder so as to bundle the wires such that the wires are not detached from the tying device. Meanwhile, in case the lid is provided integrally with the first annular holder through the hinge portion, the lid is closed so as to bring the engageable portion and the mating engageable portion into engagement with each other without winding the tape around the first annular holder.

On the other hand, in case the first annular holder is divided into a pair of the side portions and the tying device is formed by a curved continuous piece, the rib portions are initially spread outwardly without fixing the tying device to the wiring drawing board and then, the specific wires are inserted into the second annular holder. Thereafter, the rib portions are closed such that the engageable portions and the mating engageable portions provided on the rib portions, respectively are brought into engagement with each other. The opposite openings of the first annular holder are oriented downwardly in this state and are placed from above on the general wires wired on the wiring drawing board through the jigs such that the general wires are inserted into the openings of the first annular holder. Subsequently, the lid provided at the distal end of one of the side portions is closed such that the engageable portion provided at a distal end of the lid is brought into engagement with the mating engageable portion provided at a distal end of the other of the side portions.

BRIEF DESCRIPTION OF THE DRAWINGS

This object and features of the present invention will become apparent from the following description taken in conjunction with the preferred embodiments thereof with reference to the accompanying drawings, in which:

FIG. 22 is a side elevational view of a tying device which is a modification of the tying device of FIG. 20; and FIG. 23 is an exploded view of the tying device of FIG. 22.

Before the description of the present invention proceeds, it is to be noted that like parts are designated by like reference numerals throughout several views of the accompanying drawings.

DETAILED DESCRIPTION OF THE INVENTION

Figure 4:
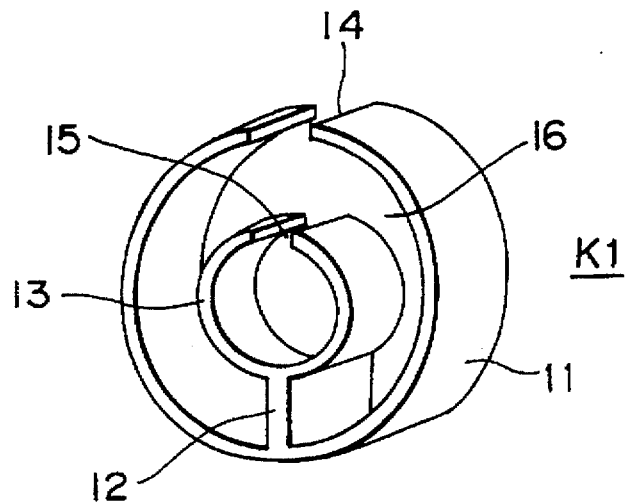
FIG. 4 is a perspective view of a tying device according to a first embodiment of the present invention.

Referring now to the drawings, there is shown in FIGS. 4 to FIGS. 10A and 10B, a tying device K1 for a wiring harness, according to a first embodiment of the present invention. The tying device K1 is formed by integral molding of flexible material including rubber such as elastomer or plastic. As shown in FIG. 4, the tying device K1 includes a large-diameter annular holder 11 for holding general wires W and a small-diameter annular holder 13 for holding specific wires W-S. The holder 13 is provided in the holder 11 through a rib 12 so as to be disposed at a central portion of the holder 11. A slit 14 for passing the general wires W and the specific wires W-S therethrough is formed on the holder 11, while a slit 15 for passing the specific wires W-S therethrough is formed on the holder 13. In FIG. 4, the rib 12 extends upwardly from a lower end of an inner peripheral surface of the holder 11. The inner peripheral surface of the holder 11 and an outer peripheral surface of the holder 13 are spaced a proper distance from each other so as to define therebetween a space 16 for accommodating the general wires W.

Figure 5:
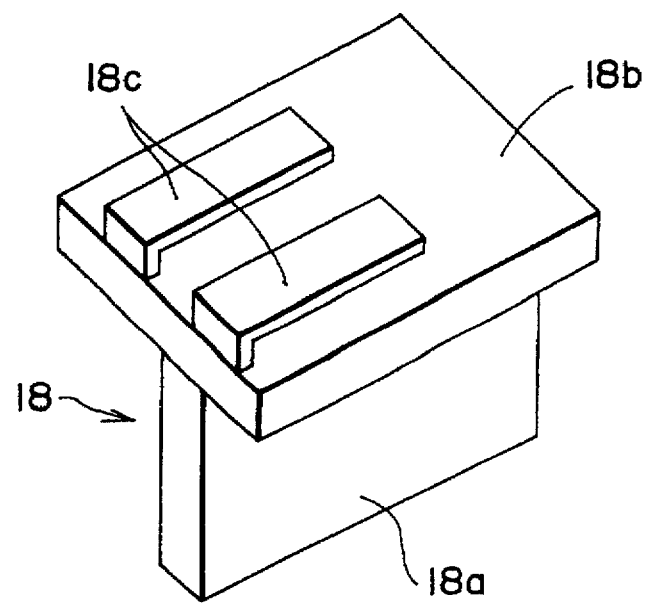
FIG. 5 is a perspective view of a jig for placing the tying device of FIG. 4 on a wiring drawing board.
Figure 6A:
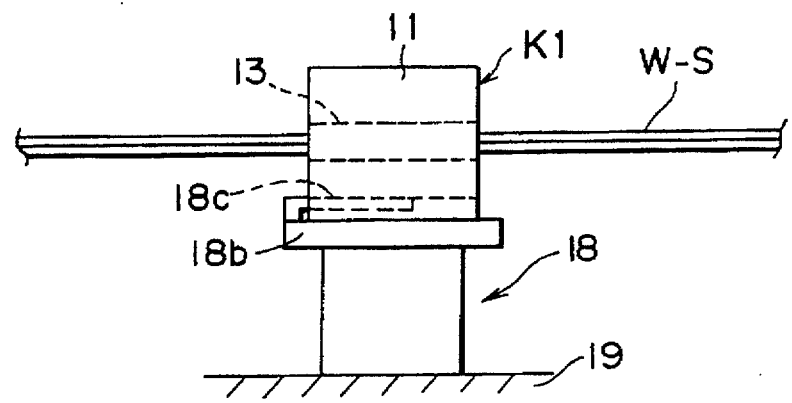
FIGS. 6A and 6B are a schematic front elevational view and a fragmentary side elevational view showing a first tying step in the tying device of FIG. 4, respectively.
Figure 8:
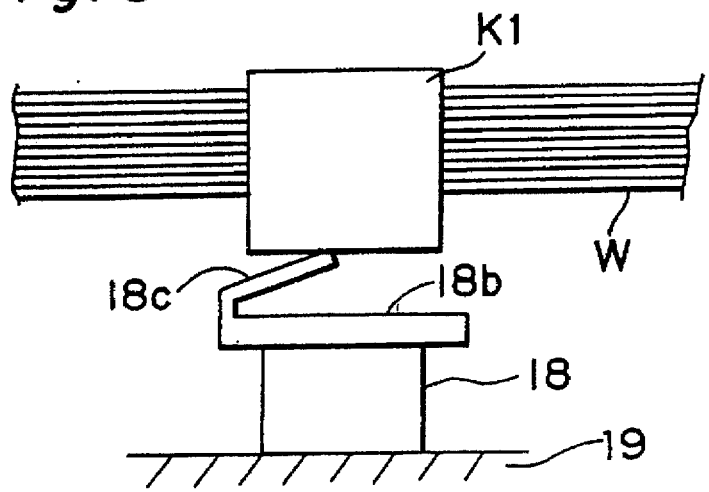
FIG. 8 is a schematic front elevational view showing a third tying step in the tying device of FIG. 4.

The tying device K1 is mounted on a jig 18 shown in FIG. 5 so as to be placed on a wiring drawing board 19 as shown in FIG. 6A. Namely, the jig 18 includes a base 18a fixed to the wiring drawing board 19 and a support plate 18b provided on an upper face of the base 18a. A pair of substantially L-shaped retainers 18c extend from one end of the support plate 18b. As shown in FIG. 8, the retainers 18c can be opened upwardly.

Figure 1:
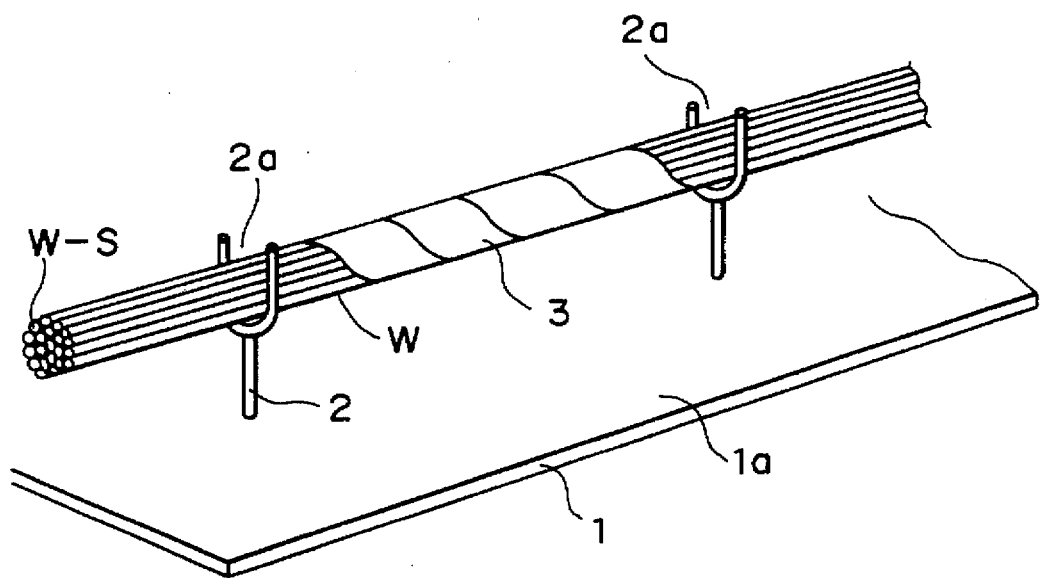
FIG. 1 is a perspective view showing a prior art wiring method (already referred to)
Figure 2:
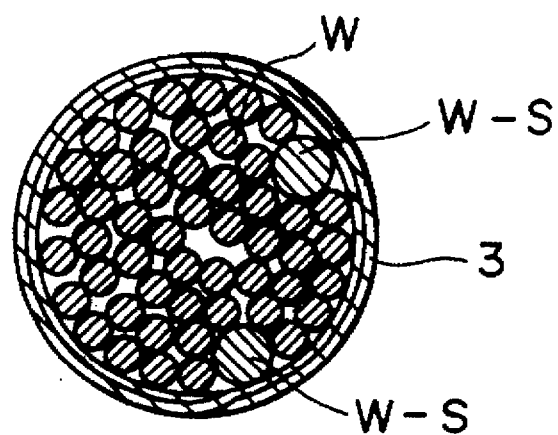
FIG. 2 is a sectional view of a prior art wiring harness (already referred to)
Figure 3:
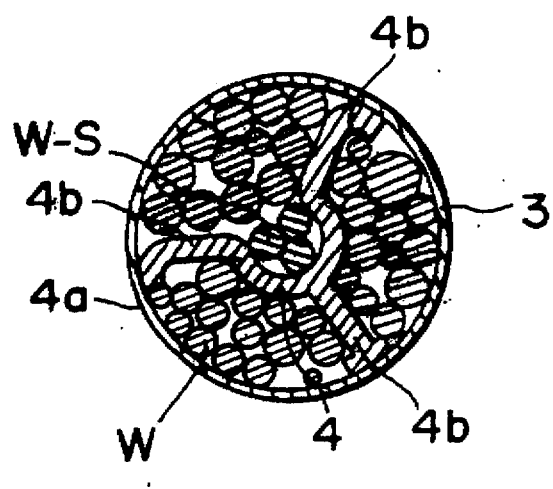
FIG. 3 is a sectional view of a prior art tying device (already referred to)

The tying device K1 is placed on the support plate 18b of the jig 18 and opposite walls of the holder 11 relative to the rib 12 are inserted between the retainers 18c and the support plate 18b so as to be gripped between the retainers 18c and the support plate 18b. The tying devices K1 secured to the jigs 18 as described above are provided at wiring locations where the specific wires should be disposed at a center of the wiring harness. At other locations on the wiring drawing board 19, ordinary wiring jigs 2 shown in FIG. 1 are provided.

Figure 6B:
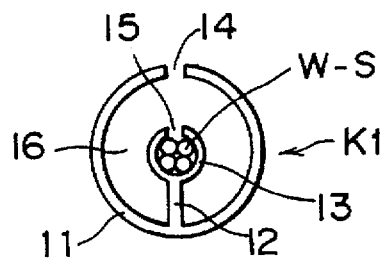
Figure 7A:
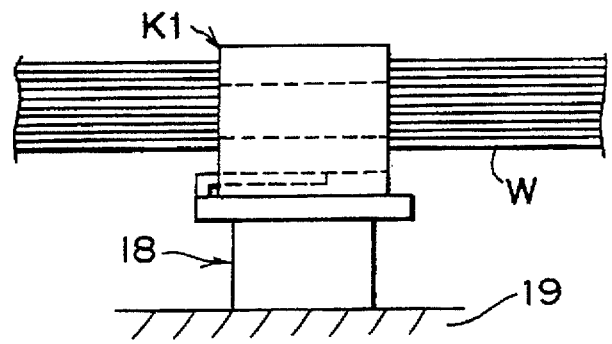
FIGS. 7a and 7B are a schematic front elevational view and a fragmentary side elevational view showing a second tying step in the tying device of FIG. 4, respectively.
Figure 7B:
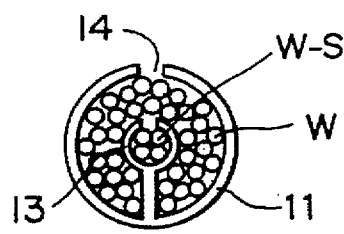
Figure 9:
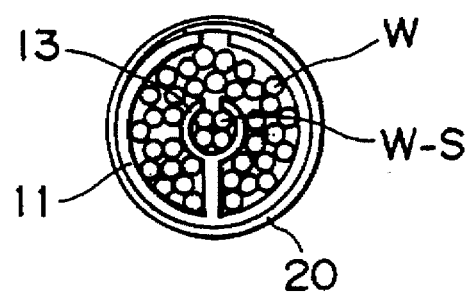
FIG. 9 is a fragmentary side elevational view of a wiring harness tied by the tying device of FIG. 4.

At the time of wiring, the specific wires W-S are initially inserted into the holder 13 through the slits 14 and 15 from above as shown in FIGS. 6A and 6B. Then, as shown in FIGS. 7A and 7B, the general wires W are inserted into the space 16 through the slit 14 from above. Subsequently, as shown in FIG. 8, the tying device K1 is removed from the jig 18 and the tying device K1 holding the specific wires W-S and the general wires W is lifted upwardly. Then, as shown in FIG. 9, a tape 20 is wound around an outer periphery of the holder 11. Winding of the tape 20 is not necessarily required to be performed specifically only at the tying device K1 but is performed at the time of winding a tape around the wire group wired on the wiring drawing board.

Figure 10A:
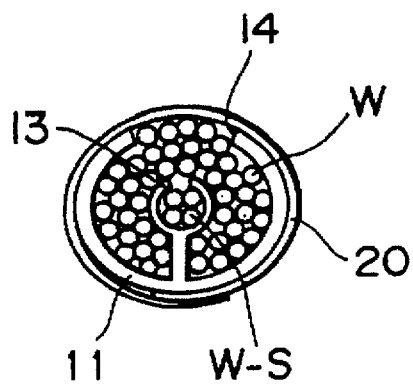
FIGS. 10A and 10B are fragmentary side elevational views showing tying action of the tying device of FIG. 4, respectively.
Figure 10B:
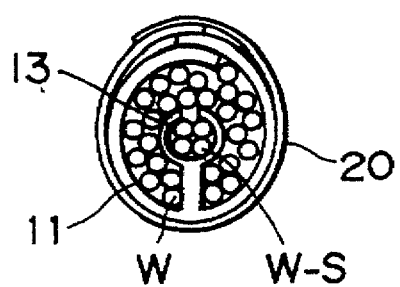

In case a proper amount of the general wires W are closely inserted into the space 16 without backlash among the general wires W, the tape 20 is wound around the holder 11 with the holder 11 in its substantially original shape as shown in FIG. 9. On the other hand, when amount of the general wires W is above the proper level, the slit 14 is opened widely as shown in FIG. 10A but is covered by the tape 20, so that the general wires W are not detached from the tying device K1. Meanwhile, in case amount of the general wires W is below the proper level and backlash is produced among the general wires when the tape is wound around the holder 11 in its original shape, the tape 20 is wound around the holder 11 in a state where opposite sides of the slit 14 of the holder 11 are overlapped as shown in FIG. 10B.

When the tying device K1 is employed as described above, the specific wires W-S are held by the holder 13 disposed at the center of the tying device K1 so as to be positioned at the center of the general wires W, while the general wires W are disposed around the specific wires W-S substantially uniformly. In this state, the specific wires W and the general wires W-S are bundled. Meanwhile, since the general wires W are also accommodated in the holder 11 when the tape 20 is wound around the holder 11, the tape 20 can be wound around the holder 11 easily. Furthermore, since the opposite sides of the holder 11 are readily deflected, the general wires W can be accommodated in the holder 11 by changing volume of the space 16 even if amount of the general wires W changes. In addition, since the holder 11 is tightened by winding the tape 20 around the holder 11, the general wires can be held closely without backlash.

Figure 11:
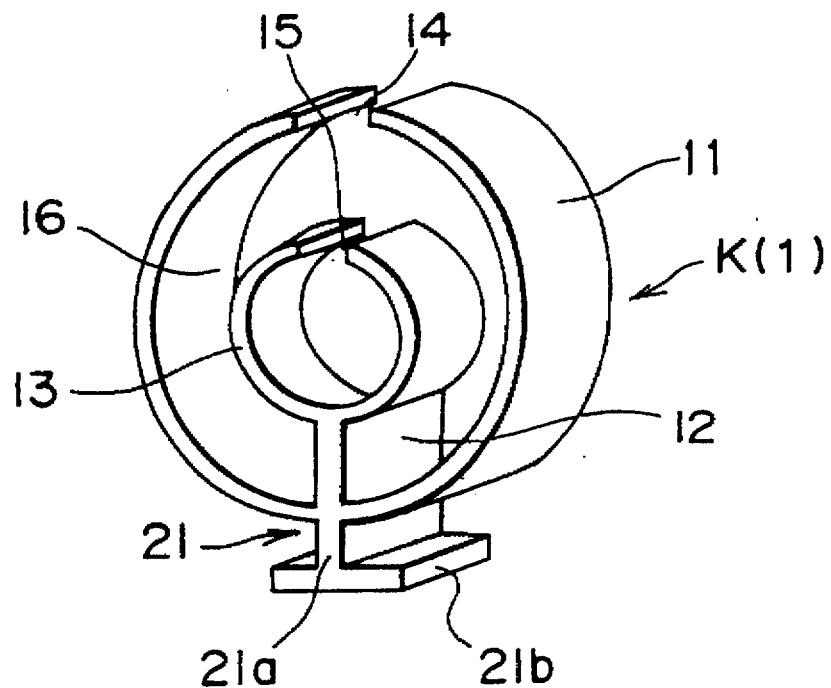
FIG. 11 is a perspective view of a tying device which is a first modification of the tying device of FIG. 4.
Figure 12:
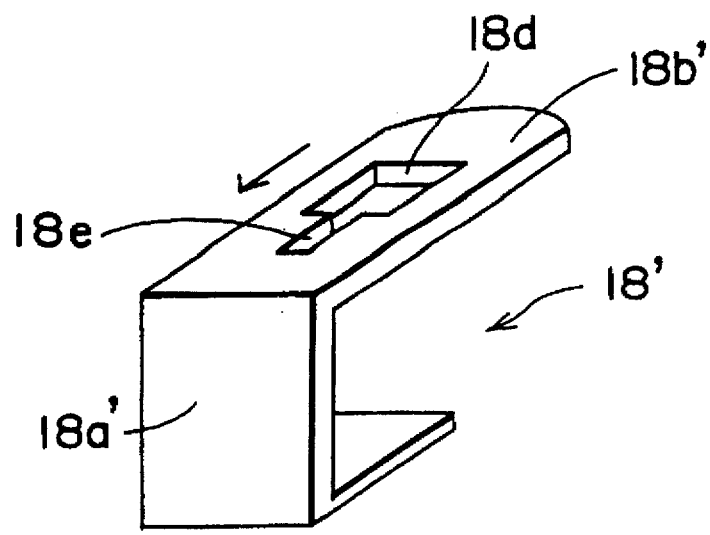
FIG. 12 is a perspective view of a jig for placing the tying device of FIG. 11 on a wiring drawing board.

FIG. 11 shows a tying device K1(1) which is a first modification of the tying device of FIG. 4. In the tying device K1(1), a T-shaped mounting portion 21 for a jig 18' shown in FIG. 12 extends downwardly from the lower end of the holder 11 and includes a vertical plate 21a and a horizontal plate 21b. The jig 18' for securing the mounting portion 21 includes a base 18a' and a support plate 18b'. The support plate 18b' has an opening 18d and a slot 18e communicating with the opening 18d. After the mounting portion 21 of the tying device K1(1) has been inserted through the opening 18d of the support plate 18b', the tying device K1(1) is moved in the direction of the arrow of FIG. 12. At this time, only the vertical plate 21a of the mounting portion 21 is moved along the slot 18e such that the support plate 18b' is gripped between the holder 11 and the horizontal plate 21b.

Figure 13:
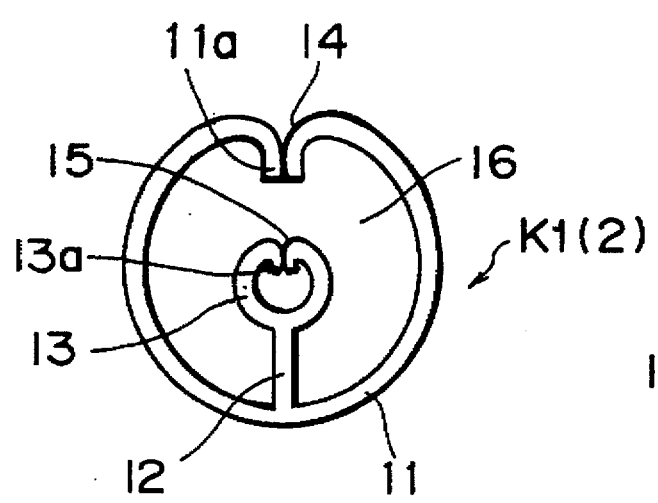
FIGS. 13 and 14 are side elevational views of tying devices which are second and third modifications of the tying device of FIG. 4, respectively.

FIG. 13 shows a tying device K1(2) which is a second modification of the tying device K1. In the tying device K1(2), a pair of protrusions 13a are, respectively, curved radially inwardly from opposite sides of the slit 15 of the holder 13 so as to be brought into contact with each other such that the slit 15 is normally closed by the protrusions 13a. Likewise, a pair of protrusions 11a are, respectively, curved radially inwardly from opposite sides of the slit 14 of the holder 11 so as to be brought into contact with each other such that the slit 14 is normally closed by the protrusions 11a. In the tying device K1(2), the specific wires W-S are inserted into the holder 13 by thrusting the protrusions 11a and 13a away from each other. After the specific wires W-S have been inserted into the holder 13, the holder 13 is closed by the protrusions 13a and thus, the specific wires W-S are contained in the holder 13. Similarly, the general wires W are inserted into the space 16 by thrusting the protrusions 11a away from each other. After the general wires W have been inserted into the space 16, the holder 11 is closed by the protrusions 11a and thus, the general wires W are contained in the space 16.

Figure 14:
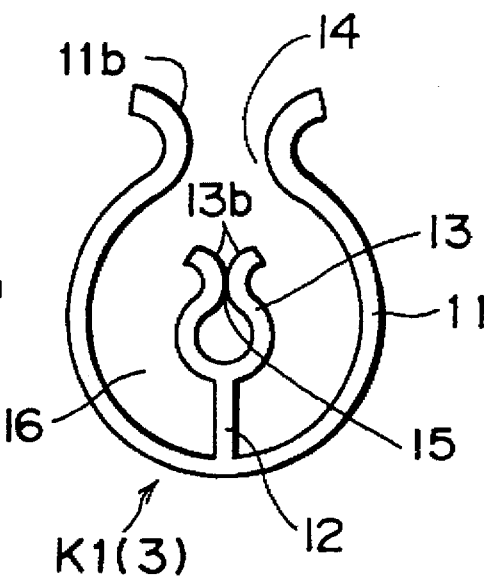

FIG. 14 shows a tying device K1(3) which is a third modification of the tying device K1. In the tying device K1(3), a pair of protrusions 13b are, respectively, curved radially outwardly from opposite sides of the slit 15 of the holder 13 so as to be brought into contact with each other such that the slit 15 is normally closed by the protrusions 13b. Thus, the protrusions 13b function in the same manner as the protrusions 13a of the tying device K1(2). On the other hand, a pair of protrusions 11b are curved radially outwardly from opposite sides of the slit 14 of the holder 11 so as to be held out of contact with each other such that a large amount of the general wires W can be easily inserted into the tying device K1(3) from the slit 14. When the tape 20 is wound around the outer periphery of the holder 11, the large slit 14 between the protrusions 11b are also covered by the tape 20. Furthermore, since the slit 14 is covered by the tape 20 by deflecting the protrusions 11b inwardly, the outwardly extending protrusions 11b offer no problem.

Figure 15:
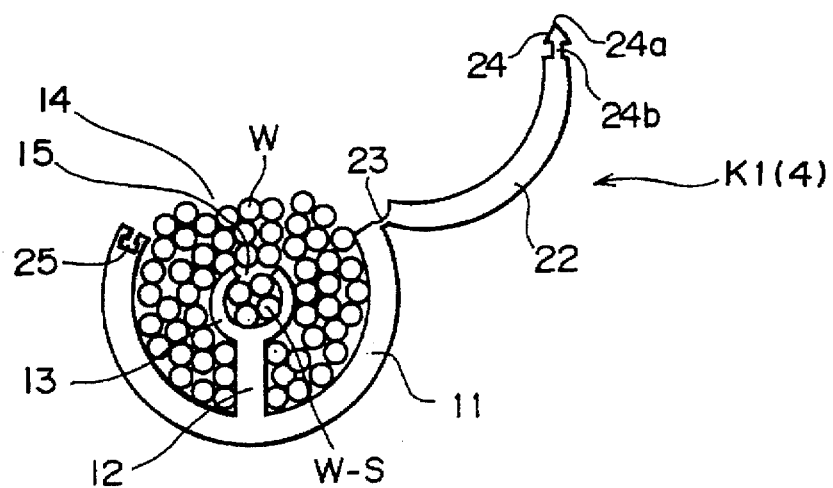
FIG. 15 is a side elevational view of a tying device which is a fourth modification of the tying device of FIG. 4.
Figure 16:
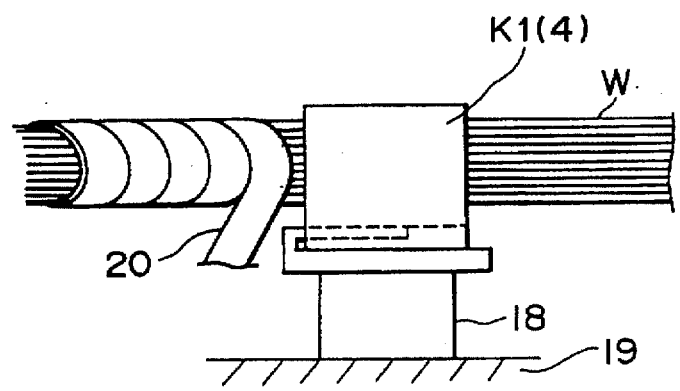
FIG. 16 is a schematic front elevational view showing a tying step in the tying device of FIG. 15.

FIG. 15 shows a tying device K1(4) which is a fourth modification of the tying device K1. In the tying device K1(4), a lid 22 is formed integrally with the holder 11 of the tying device K1. In the tying device K1(4), since the lid 22 is provided, the slit 14 of the holder 11 is formed by a large opening of the holder 11 to be covered by the lid 22. Namely, the holder 11 has a substantially semicircular shape and an upper half portion of the holder 11 is formed by the opening. The lid 22 is continuously formed at one end of the holder 11 through a thin hinge 23. An engageable portion 24 projects from a distal end of the lid 22. A mating engageable portion 25 into which the engageable portion 24 is inserted so as to be brought into engagement with the mating engageable portion 25 is recessed at the other end of the holder 11. The engageable portion 24 has a conical tip 24a extending from a rod portion 24b, while the mating engageable portion 25 is formed by a bore for receiving the tip 24a such that the tip 24a is brought into engagement with the bore. In the tying device K1(4), since the slit 14 of the holder 11 is covered by the lid 22, tape winding for closing the slit 14 so as to prevent detachment of the general wires W from the tying device K1(4) becomes unnecessary. Therefore, as shown in FIG. 16, the tape 20 for bundling the wired wire group is not wound around the tying device K1(4).

Figure 17:
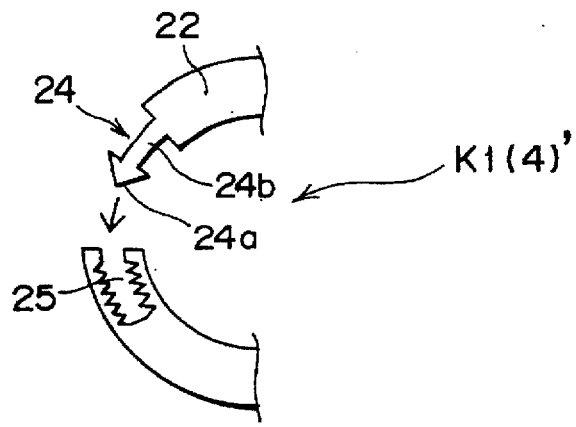
FIG. 17 is a fragmentary side elevational view showing a variation of an engageable portion and a mating engageable portion for a lid of the tying device of FIG. 15.

FIG. 17 shows a variation of the engageable portion 24 and the mating engageable portion 25 for the lid 22 of the tying device K1(4). In FIG. 17, the rod portion 24b of the engageable portion 24 is formed longer than that of FIG. 15 and the mating engageable portion 25 has a sawtoothed shape in contrast with the bore of FIG. 15. By this arrangement of the variant tying device K1(4)', since position of engagement of the tip 24a with the mating engageable portion 25 can be adjusted in accordance with amount of the general wires W inserted into the tying device K1(4)', backlash among the general wires W can be reduced.

Figure 18A:
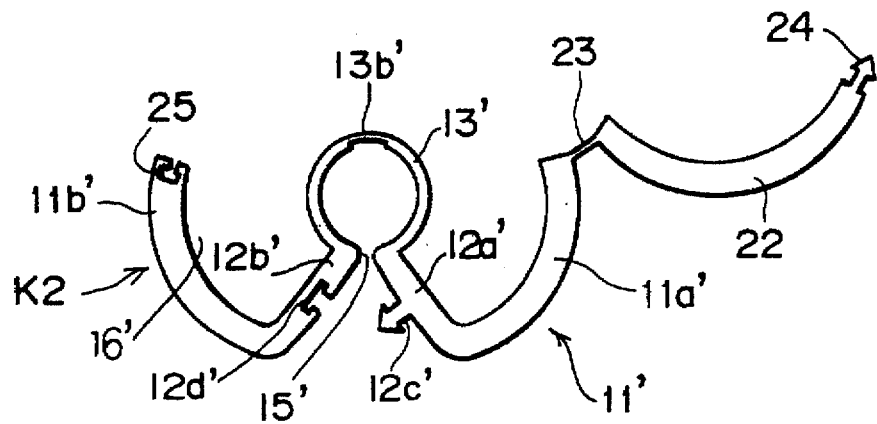
FIGS. 18A, 18B is and 18C are side elevational views showing first, second and third tying steps in a tying device according to a second embodiment of the present invention, respectively.
Figure 18B:
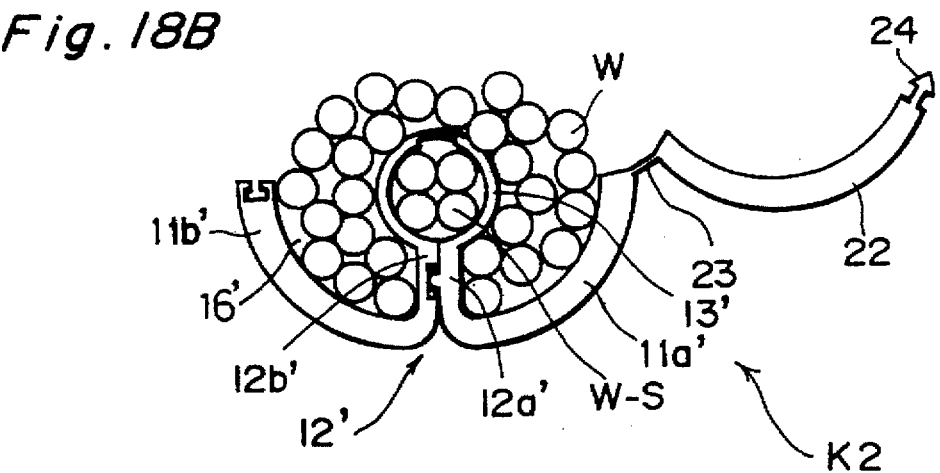
Figure 18C:
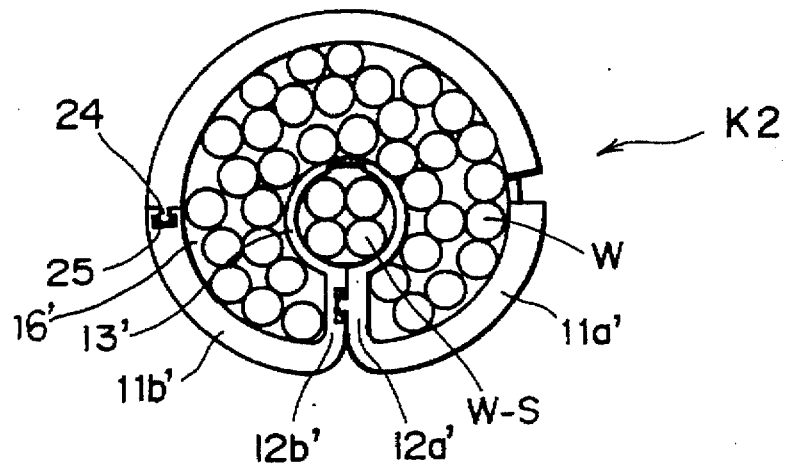
Figure 19A:
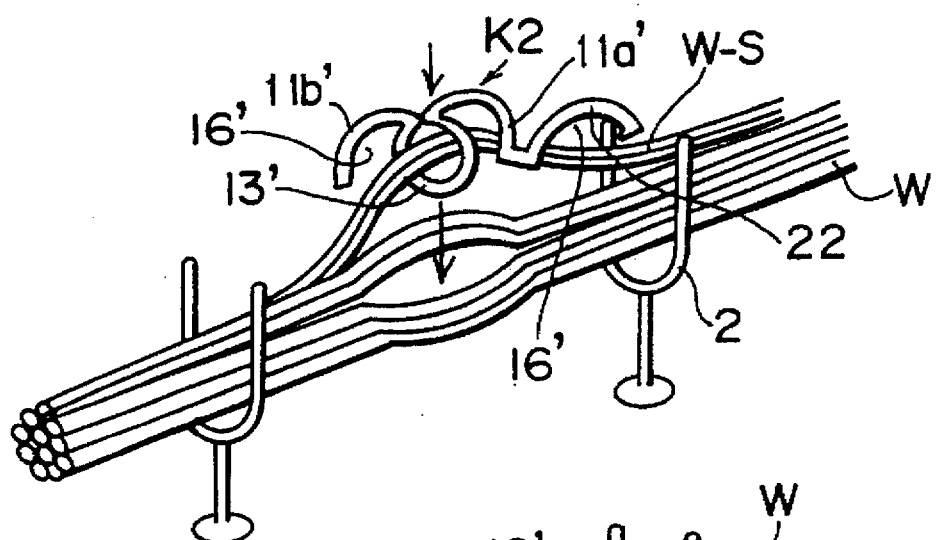
FIGS. 19A and 19B are schematic perspective views indicative of steps for mounting the tying device of FIG. 18A on general wires, respectively.
Figure 19B:
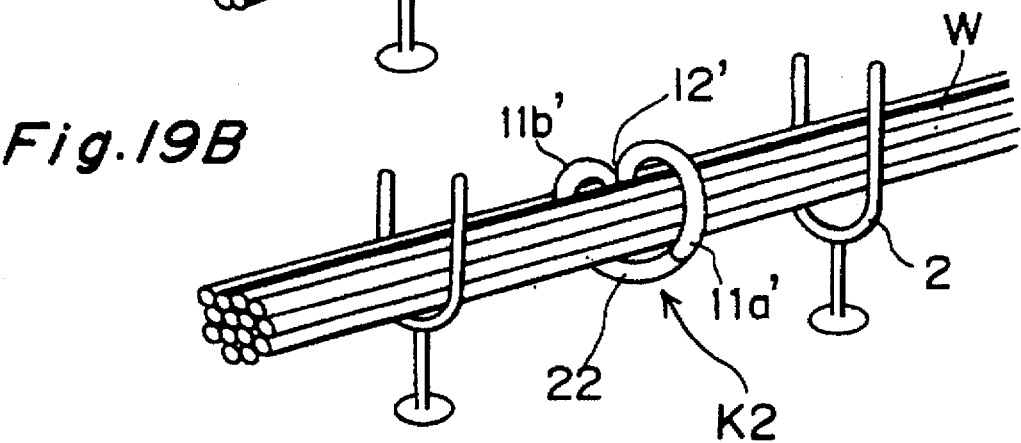

FIGS. 18A to 18C show tying steps in a tying device K2 according to a second embodiment of the present invention, while FIGS. 19A and 19B show a method of using the tying device K2. As shown in FIG. 18A, the tying device K2 is formed by a plurality of curved continuous pieces and includes a holder 13' for the specific wires W-S and a holder 11' for the general wires W. A slit 15' for inserting the specific wires W-S into the holder 13' is formed at a lower end of the holder 13', while a thin hinge 13b' is provided at an upper end of the holder 13' such that the holder 13' has a continuous upper annular shape. A rib 12' is axially divided into rib portions 12a' and 12b' and the slit 15' is defined between upper end portions of the rib portions 12a' and 12b'. An engageable portion 12c' and a mating engageable portion 12d' engageable with the engageable portion 12c' are, respectively, formed on opposed inner faces of the rib portions 12a' and 12b'. The engageable portion 12c' and the mating engageable portion 12d' are brought into engagement with each other so as to lock the holder 13' in closed state.

The holder 11' is divided into a pair of opposite side portions 11a' and 11b' The side portions 11a' and 11b' are curved upwardly from lower ends of the rib portions 12a' and 12b', respectively. In a state where the rib portions 12a' and 12b' are attached to each other through engagement of the engageable portion 12c' with the mating engageable portion 12d', the small-diameter holder 13' is disposed at the center of the large-diameter holder 11' through the rib 12' such that a space 16' for accommodating the general wires W is defined between the holders 13' and 11' in the same manner as the tying device K1.

In the same manner as the tying device K1(4) of FIG. 15, the lid 22 is provided at an upper end of the rib portion 11a' through the thin hinge 23. Furthermore, the engageable portion 24 projects from the distal end of the lid 22, while the mating engageable portion 25 is provided at an upper end of the rib portion 11b'.

In contrast with the tying device K1, the tying device K2 is not required to be installed on the wiring drawing board 19. Thus, as shown in FIG. 18A, when the slit 15' for the holder 13' is opened by detaching the rib portions 12a' and 12b' from each other, the specific wires W-S are inserted into the holder 13'. Then, the rib portions 12a' and 12b' are attached to each other through engagement of the engageable portion 12c' with the mating engageable portion 12d' so as to lock the specific wires W-S in the holder 13'. In a state where the rib portions 12a' and 12b' are attached to each other, the side portions 11a' and 11b' enclose the holder 13' such that the space 16' is defined between an outer periphery of the holder 13' and an inner periphery of the side portions 11a' and 11b'. In this state, the general wires W are inserted into the space 16' as shown in FIG. 18B. Actually, as shown in FIG. 19A, while the holder 13' is being thrusted from above into a central portion of the general wires W wired by the jigs 2 by orienting an opening of the holder 11' downwardly, the wired general wires W are depressed into the space 16'. Subsequently, as shown in FIGS. 18C and 19B, the lid 22 is closed through engagement of the engageable portion 24 with the mating engageable portion 25 so as to hold the general wires W.

The tying device K2 is not required to be placed on the wiring drawing board 19 through the jigs 2. Namely, at an interval of the specific wires W-S, where the specific wires W-S should be positioned at the center of the wiring harness, the specific wires W-S are picked up as shown in FIG. 19A and are inserted into the holder 13' so as to be held in the holder 13'. Then, when the general wires W held by the jigs 2 as shown in FIG. 19A are mounted on the tying device K2, not only the specific wires W-S can be positioned at the center of the general wires W but the general wires W can be inserted into the space 16' so as be held in the space 16'.

Figure 20:
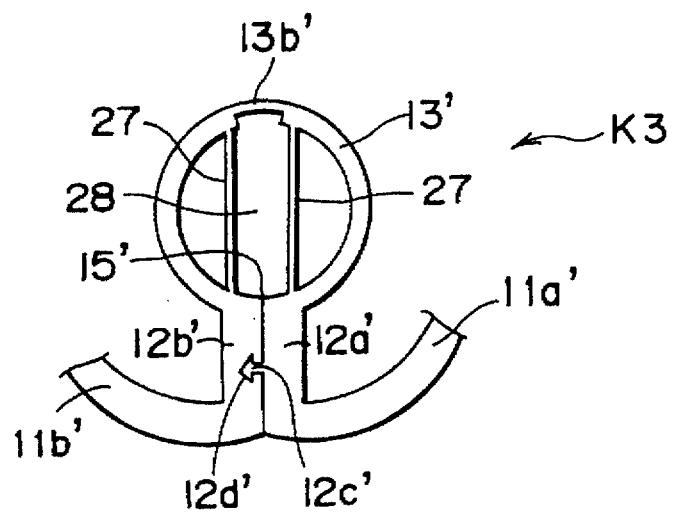
FIG. 20 is a fragmentary side elevational view of a tying device according to a third embodiment of the present invention.

FIG. 20 shows a tying device K3 according to a third embodiment of the present invention. The tying device K3 includes a pair of thin partition walls 27 in the holder 13'. The partition walls 27 are brought into close contact with the specific wires W-S so as to hold the specific wires W-S without backlash among the specific wires W-S. The partition walls 27 are provided at opposite positions of the slit 15' so as to confront each other such that a space 28 for accommodating the specific wires W-S is defined between the partition walls 27.

Figure 21A:
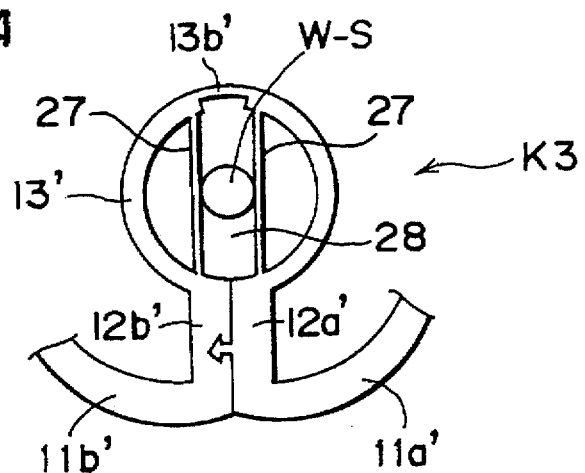
FIGS. 21A and 21B are fragmentary side elevational views of the tying device of FIG. 20, into which one specific wire and a plurality of specific wires are inserted, respectively.
Figure 21B:
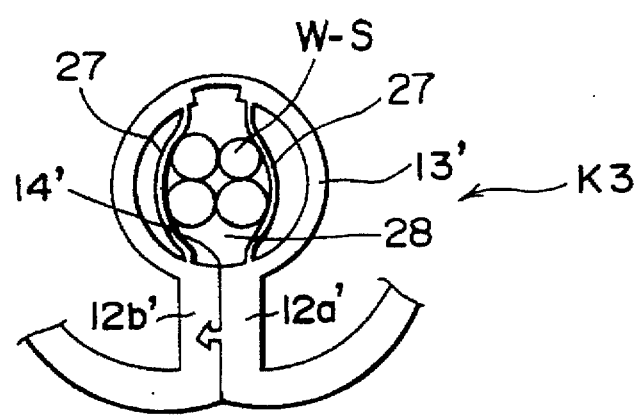

In case amount of the specific wires W-S inserted into the space 28 is small as shown in FIG. 21A, the partition walls 27 are brought into close contact with the specific wires W-S without being spread outwardly. On the contrary, when amount of the specific wires W-S inserted into the space 28 is large as shown in FIG. 21B, the partition walls 27 are spread outwardly so as to be brought into close contact with the specific wires W-S. Therefore, regardless of amount of the specific wires W-S inserted into the space 28, the specific wires W-S can be closely held in the space 28 without backlash among the specific wires W-S.

FIGS. 22 and 23 show a tying device K3' which is a modification of the tying device K3. In the tying device K3', a pair of partition walls 27' are provided in the holder 13' and central portions of the partition walls 27' are curved inwardly towards each other. Furthermore, opposite end portions 27a' of each of the partition walls 27', which abut on an inner peripheral surface of the holder 13', are formed thin such that the partition walls 27' can be readily deformed. Since the partition walls 27' are formed as described above, the partition walls 27' are readily deformed in accordance with amount of the specific wires W-S inserted between the partition walls 27' and thus, the specific wires W-S can be held closely without backlash among the specific wires W-S more effectively.

In the tying device K3', the engageable portion 12c' and the mating engageable portion 12d' between the rib portions 12a' and 12b' and an engageable portion 24' and a mating engageable portion 25' for the lid 22 are of hooked arrangement as shown in FIG. 23.

As is clear from the foregoing description, the specific wires such as a power source line and a twist wire for a loudspeaker can be positively positioned at the sectional center of the wiring harness by the tying device of the present invention so as to be enclosed by the general wires. Therefore, even if the wiring harness is brought into contact with a vehicle body panel or the like, breaking of the general wires happens initially such that initial breaking of the specific wires can be prevented.

Meanwhile, in case the slit of the holder for the specific wires is arranged to be closed, the specific wires inserted into the holder can be held in the holder reliably. Furthermore, since the general wires disposed at the outer periphery of the specific wires are also held in the holder for the general wires, the whole wires of the wiring harness can be held at their respective predetermined positions by the tying device. Especially, in case the lid is provided on the tying device, the tape is not required to be wound around the tying device and thus, tying operation is facilitated.

In addition, in case the tying device is made of flexible material and the tape is wound around the holder for the general wires, the space for accommodating the general wires can be varied in accordance with amount of the general wires inserted into the space. On the other hand, even in the case of the lid type tying device, volume of the space for accommodating the general wires can be varied by changing position for fixing the lid. Moreover, also in the case of the lid type tying device, since the tape is wound around portions of the general wires other than the tying device, the general wires can be bundled closely without backlash among the general wires.

What is claimed is:

1. A tying device for tying a wiring harness, comprising:
 a first annular holder for holding general wires, which has a first slit for inserting therethrough the general wires into the first annular holder; and
 a second annular holder for holding specific wires, which has a second slit for inserting therethrough the specific wires into the second annular holder, and a pair of protrusions being, respectively, curved radially inwardly from opposite sides of the second slit of the second annular holder so as to be brought into contact with each other such that the second slit is closed by the protrusions;
 wherein said second annular holder has a diameter smaller than a diameter of said first annular holder so as to extend into said first annular holder from an inner peripheral surface of said first annular holder through a rib;
 wherein the second annular holder is positioned at a central portion of the first annular holder such that a space for accommodating the general wires is defined between the inner peripheral surface of the first annular holder and an outer peripheral surface of the second annular holder; and wherein said first and second slits are aligned with each other so as to confront each other.

2. A tying device as claimed in claim 1, wherein when the tying device has been placed on a wiring drawing board, said first and second slits are oriented upwardly such that the general wires and the specific wires are inserted into the tying device through said first and second slits from above.

3. A tying device as claimed in claim 1, wherein a mounting portion for mounting the tying device on a wiring drawing board is provided at a lower end of the first annular holder and is inserted into a mounting opening of a jig to be installed on the wiring drawing board so as to be engaged with the mounting opening.

4. A tying device for tying a wiring harness, comprising:

a first annular holder for holding general wires, which has a first slit for inserting therethrough the general wires into the first annular holder; and a second annular holder for holding specific wires, which has a second slit for inserting therethrough the specific wires into the second annular holder, and a pair of protrusions being, respectively, curved radially outwardly from opposite sides of the second slit of the second annular holder so as to be brought into contact with each other such that the second slit is closed by the protrusions;

wherein said second annular holder has a diameter smaller than a diameter of said first annular holder so as to extend into said first annular holder from an inner peripheral surface of said first annular holder through a rib;

wherein the second annular holder is positioned at a central portion of the first annular holder such that a space for accommodating the general wires is defined between the inner peripheral surface of the first annular holder and an outer peripheral surface of the second annular holder; and wherein said first and second slits are aligned with each other so as to confront each other.

5. A tying device as claimed in claim 4, wherein when the tying device has been placed on a wiring drawing board, said first and second slits are oriented upwardly such that the general wires and the specific wires are inserted into the tying device through said first and second slits from above.

6. A tying device as claimed in claim 4, wherein a mounting portion for mounting the tying device on a wiring drawing board is provided at a lower end of the first annular holder and is inserted into a mounting opening of a jig to be installed on the wiring drawing board so as to be engaged with the mounting opening.

7. A tying device for tying a wiring harness, comprising:

a first annular holder for holding general wires, which has a first slit for inserting therethrough the general wires into the first annular holder; and a second annular holder for holding specific wires, which has a second slit for inserting therethrough the specific wires into the second annular holder;

wherein said second annular holder has a diameter smaller than a diameter of said first annular holder so as to extend into said first annular holder from an inner peripheral surface of said first annular holder through a rib;

wherein the second annular holder is positioned at a central portion of the first annular holder such that a space for accommodating the general wires is defined between the inner peripheral surface of the first annular holder and an outer peripheral surface of the second annular holder;

wherein said first and second slits are aligned with each other so as to confront each other;

wherein the tying device is formed by integral molding of flexible material; and wherein a tape is wound around the first annular holder in accordance with the amount of the general wires inserted into the space so as the close the first slit such that the volume of the space can be varied by the tape.

8. A tying device for tying a wiring harness, comprising:

a first annular holder for holding general wires, which has a first slit for inserting therethrough the general wires into the first annular holder; and a second annular holder for holding specific wires, which has a second slit for inserting therethrough the specific wires into the second annular holder;

wherein said second annular holder has a diameter smaller than a diameter of said first annular holder so as to extend into said first annular holder from an inner peripheral surface of said first annular holder through a rib;

wherein the second annular holder is positioned at a central portion of the first annular holder such that a space for accommodating the general wires is defined between the inner peripheral surface of the first annular holder and an outer peripheral surface of the second annular holder;

wherein said first and second slits are aligned with each other so as to confront each other;

wherein the first slit is formed by a large opening and a lid is continuously provided, through a thin hinge, on the first annular holder at one end of the opening; and wherein an engageable portion is provided at a distal end of the lid and a mating engageable portion engageable with the engageable portion is provided on the first annular holder at the other end of the opening.

9. A tying device for tying a wiring harness, comprising:

a first annular holder for holding general wires, which has a first slit for inserting therethrough the general wires into the first annular holder; and a second annular holder for holding specific wires, which has a second slit for inserting therethrough the specific wires into the second annular holder;

wherein said second annular holder has a diameter smaller than a diameter of said first annular holder so as to extend into said first annular holder from an inner peripheral surface of said first annular holder through a rib;

wherein the second annular holder is positioned at a central portion of the first annular holder such that a space for accommodating the general wires is defined between the inner peripheral surface of the first annular holder and an outer peripheral surface of the second annular holder; and wherein said first annular holder further comprises a mounting portion, at a lower end of said first annular holder, for mounting the tying device on a wiring drawing board, said mounting portion adapted to be inserted into a mounting opening of a jig to be installed on the wiring drawing board so as to be engaged with the mounting opening.

10. A tying device as claimed in claim 9, wherein a pair of protrusions are, respectively, curved radially inwardly from opposite sides of said second slit so as to be brought into contact with each other to close said second slit.

11. A tying device as claimed in claim 9, wherein a pair of protrusions are, respectively, curved radially outwardly from opposite sides of said second slit so as to be brought into contact with each other to close said second slit.

12. A tying device as claimed in claim 9, wherein said first and second slits are aligned with each other so as to confront each other.

13. A tying device as claimed in claim 9, wherein, when the tying device has been placed on a wiring drawing board, said first and second slits are oriented upwardly such that the general wires and the specific wires are insertable into the tying device through said first and second slits from above.

14. A tying device as claimed in claim 9, wherein the tying device is formed by integrally molding a flexible material; wherein a tape is wound around said first annular holder in accordance with an amount of the general wires inserted into the space defined by said first annular holder, so as to close said first slit such that a volume of the space is variable by said tape.

15. A tying device as claimed in claim 9, wherein said first slit comprises a large opening and a lid is continuously provided, through a thin hinge, on said first annular holder at one end of said opening;

wherein an engageable portion is provided at a distal end of said lid and a mating engageable portion engageable with said engageable portion is provided on said first annular holder at an other end of said opening.

16. A tying device as claimed in claim 9, wherein a pair of thin partition walls are, respectively, provided in said second annular holder at opposite sides of said second slit and the specific wires are insertable into a further space defined between said partition walls such that said partition walls are brought into close contact with the specific wires.

* * * * *

UNITED STATES PATENT AND TRADEMARK OFFICE
CERTIFICATE OF CORRECTION

PATENT NO. : 5,677,513
DATED : October 14, 1997
INVENTOR(S) : T. ITO et al.

It is certified that error appears in the above-indentified patent and that said Letters Patent is hereby corrected as shown below:

On the cover page of the printed patent, paragraph [75] Inventors, line 3, change "Yokkaichi" to ---Yokkaichi City---.

On the cover page of the printed patent, paragraph [73] Assignee, line 2, change "Yokkaichi" to ---Yokkaichi City---.

Signed and Sealed this

Eighth Day of September, 1998

Attest:

BRUCE LEHMAN

*Attesting Officer*     Commissioner of Patents and Trademarks